United States Patent [19]
Oyanagi

[11] Patent Number: 4,739,545
[45] Date of Patent: Apr. 26, 1988

[54] COMPOSITE MOVEMENT TABLE APPARATUS

[75] Inventor: Hideaki Oyanagi, Fujisawa, Japan

[73] Assignee: Nippon Seiko Kabushiki Kaisha, Tokyo, Japan

[21] Appl. No.: 19,223

[22] Filed: Feb. 26, 1987

[30] Foreign Application Priority Data

Feb. 28, 1986 [JP] Japan .................. 61-028919[U]

[51] Int. Cl.⁴ .................. B23Q 5/00; B23C 1/; B23C 00; B41F 15/00
[52] U.S. Cl. .................. 29/57; 29/846; 101/407 BP; 400/31; 409/227
[58] Field of Search .......... 409/217, 227, 219; 29/33 M, 33 H, 563, 56.6, 846, 885, 742, 569.1, 570.1, 825, 57; 101/382 MV, 407 BP, 407 R; 269/58, 71; 400/31

[56] References Cited

U.S. PATENT DOCUMENTS

| | | | |
|---|---|---|---|
| Re. 29,206 | 5/1977 | Jaffa | 101/407 BP X |
| 2,200,628 | 5/1940 | Lofstedt | 409/227 X |
| 3,572,680 | 3/1971 | Neff | 409/219 |
| 3,610,148 | 10/1971 | Penaluna | 101/407 BP |
| 3,920,233 | 11/1975 | Stuckert | 29/569.1 |
| 3,960,072 | 6/1976 | Ahigren et al. | 400/31 X |
| 4,561,815 | 12/1985 | Trevarrow | 409/227 |

FOREIGN PATENT DOCUMENTS

| | | | |
|---|---|---|---|
| 56363 | 5/1981 | Japan | 409/227 |
| 196834 | 11/1983 | Japan | 29/57 |
| 160985 | 7/1979 | Netherlands | 29/742 |

Primary Examiner—William R. Briggs
Attorney, Agent, or Firm—Arnold S. Weintraub

[57] ABSTRACT

By operating a Z direction position adjustment mechanism by a driving motor, a Z table movable in the X and Y directions can be moved in a Z direction while maintaining its horizontal condition. Vibrations caused in the Z table when the Z table is moved at a high speed in the X and Y directions are damped by vibration damping means provided between the Z table and a base bed fixed to a coarse adjustment table which is mounted on a base and driven in the X and Y directions. Improvement in the accuracy of positioning in the X and Y directions is achieved, as well as a vibration damping effect. A chuck holding member is formed on the table to hold a chuck by suction which in turn holds a mounted member by suction, thereby making the exchange of the chuck easy and preserving the parallelism of the upper surface of the chuck.

10 Claims, 7 Drawing Sheets

COMPOSITE MOVEMENT TABLE APPARATUS

BACKGROUND OF THE INVENTION

1. Field of the Invention

The present invention relates to a composite movement table movable in at least a plane including a Z axis, and in particular, to a composite movement table which achieves a high degree of accuracy of parallelism and positioning when the movement table is moved at high speeds, and which provides a chuck for removably holding an exposed member for mounting on the movement table depending on the size of the exposed member.

2. Description of the Prior Art

In the manufacturing process of a semiconductor integrated circuit, lithography is used to expose a wafer coated with photo resist and to develop a desired circuit pattern thereon. Lithography requires highly accurate positioning, on the order of 0.1 micron, due to the trend toward higher integration of the semiconductor integrated circuit.

To achieve such highly accurate positioning is difficult for prior art movement table apparatus in which a movement table is merely moved by a feed screw. For this reason, it has been proposed to use a table which is moved by a screw serving as the coarse adjustment, with a fine adjustment bed movably supported for minute adjustment provided on the coarse adjustment table. The absolute position of the fine adjustment bed is measured by a laser measuring instrument, and an error in the movement of the coarse adjustment table is corrected by a minute displacement of the fine adjustment bed, thereby achieving precise positioning.

The lithography generally employed is projection photo lithography. Projection photo lithography is a so-called step-and-repeat type operation, in which a small integrated circuit pattern is developed on a wafer in sequential steps. This requires maintaining the parallelism and positioning of the light receiving surface of the wafer with high accuracy. Therefore, it is also necessary to maintain the parallelism and positioning of the upper surface of the table for mounting the wafer thereon with high accuracy.

Prior art composite movement tables are, for example, Japanese Utility Model Laid-Open (Kokai) Publication No. 58-196834 and U.S. Pat. No. 4,561,815.

Figure 2:
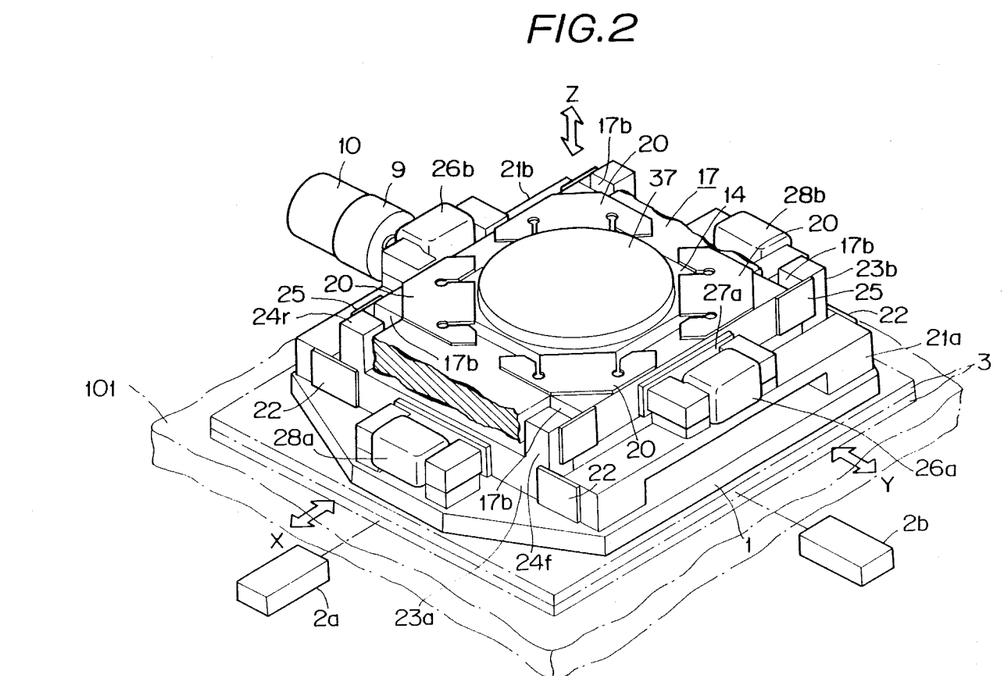
FIG. 2 is a schematic perspective view of an embodiment of the present invention.

In Japanese Utility Model laid-Open Publication No. 58196834, a Z axis uppermost type of composite table having a Z axis table at the uppermost stage side, as shown in FIG. 2, and a Z axis lowermost type having the Z axis table at the lowermost stage side are disclosed. Both types employ an oblique feeding system utilizing an oblique surface for moving the table in the Z axis direction. Also, they are structured to achieve movement in the Z axis direction by moving a Z slider horizontally.

However, in the aforementioned prior art Z axis uppermost type of composite tables, since the Z slider is mounted on the upper surface of an XY slider, the weight of the Z slider is imposed on the XY slider, resulting in an increase in the inertial mass of the XY slider during operation, rendering it impossible to increase the operation speed. Further, since the load applied on a supporting section of the XY slider is large, it is necessary to increase the strength of the XY slider. Thus, the XY slider becomes large and heavy, making it impossible to make the movement table small in size and light in weight. Moreover, since the XY slider is structured as a separate member and the supporting sections are independent from each other, it is necessary to make the XY movement plane parallel with the upper surface of the Z slider. Hence, an error in the Z direction is apt to be caused by the operation of the XY slider. Thus, this prior art table cannot be used for lithography and similar operations which require strict parallelism.

On the other hand, in the Z axis lowermost type, since the XY slider is mounted on the Z slider, the operation of the XY slider and the operation of the Z slider can be performed independently from each other. Accordingly, when XYZ sliders are used for lithography, the purpose of the Z slider is for focusing. Since the frequency of operation in the Z direction is not so large, there is an advantage in that, even when the XY slider is mounted on the Z slider, the problem of increased inertia can be largely eliminated. However, since it is necessary to work both the Z slider and the XY slider mounted on the Z slider in a tapered shape, the problem still remains that maintaining strict parallelism as required is difficult.

Furthermore, in both the Z axis uppermost type and the Z axis lowermost type, movement in the Z axis is achieved by moving the Z slider in a horizontal direction. Since the Z slider and the table mounted on the Z slider and movable in the Z direction are in contact with each other, with their surfaces forming oblique surfaces, a problem arises in that the more the precision of the surfaces and the roughness of the surfaces are improved, the larger the sliding frictional resistance becomes. It requires great power to move the Z slider, while at the same time stick-slip is likely to occur. This drawback is more serious, in particular, in the Z axis lowermost type of composite table having the XY slider mounted on the Z slider.

In order to solve these problems, one might consider applying the machine tool adjustment disclosed in U.S. Pat. No. 4,561,815 as the Z direction position adjustment mechanism. In this patent, a head slide is supported through ball bearings by a wedge having its upper surface formed as a horizontal surface. By moving the wedge horizontally by a threaded shaft rotated by a stepping motor fixed to the head slide, the head slide is raised or lowered in the Z direction. However, in such a structure, since the stepping motor is fixed to the head slide, vibrations caused by driving the stepping motor are transmitted directly to the head table (Z table). Hence it is difficult to achieve positioning with an accuracy of the order of a sub-micron, as is required in the case of the lithography.

For this reason, as shown in FIG. 2 of the aforementioned U.S. Pat. No. 4,561,815, one might consider attaching the stepping motor to a machine tool frame. If this is done, since the upper surface of the wedge (oblique slider) is an oblique surface, when the XY movement table placed on such wedge is moved in X and Y directions, the XY table is also displaced in the Z direction following the movement in the X and Y directions. Thus, there is a problem in that the Z direction position deviates subsequent to the movement in the X and Y directions. Moreover, another problem arises in that the ball bearings interposed between the wedge and the head slide are shifted downwardly on the oblique surface during use, and smooth operation of the wedge can not be insured. In this case, although the amount of shift of the ball bearing downwardly caused by the movement of the wedge is slight, such shifts accumulate and the amount of shift will be large over time.

Further, lithography of the projection photo type uses the step-and-repeat technique in which an integrated circuit pattern is developed on a wafer one step at a time. Several hundred positionings may be required for one sheet of wafer. Thus, the total time required for the positionings is large, and in order to improve the efficiency of the exposure process, it is necessary that the positioning be performed in a short time.

A prior art apparatus which satisfies this requirement is proposed by the applicant of this application in Japanese Utility Model Laid-Open (Kokai) Publication No. 58-105604. In this prior art apparatus, a fine adjustment bed is resilient supported on a coarse adjustment table. A viscous fluid fills the volume between a vibration damping section formed in the fine adjustment bed and a receiving surface formed on the coarse adjustment table to provide a damping effect for the vibrations.

However, in the above-referenced prior art apparatus, although there is an advantage in that the vibrations caused in the fine adjustment bed when the coarse adjustment table is moved at high speeds are effectively damped by the high viscosity viscous fluid between the damping surface of the damping section and the receiving surface of the coarse adjustment table thereby enabling positioning at high speeds, since the vibration damping section is immersed in the viscous fluid, when the viscosity of the viscous fluid is increased in order to enhance the damping effect of the vibrations, resistance caused by compression of the viscous fluid by a side wall of the vibration damping section at the time when the fine adjustment bed is moved becomes very large. This is not desirable since the movement of the fine adjustment bed is hindered. Accordingly, in order to insure the smooth movement of the fine adjustment bed, the viscosity of the viscous fluid must be sharply decreased, and if this is done, the damping effect of the vibrations will be decreased. Therefore, there remains an unsolved problem in that both the smooth movement of the fine adjustment bed and the damping effect of the vibrations cannot be achieved simultaneously.

Prior art projection photo lithography is incorporated into the production line of the semiconductor integrated circuit in which a circuit pattern is exposed and developed on a wafer. It is usual that such a lithography device is used exclusively for a wafer of an appropriate size.

In such a device, since the size of a wafer placed on a chuck is constant, the size of a wafer holding section of a loading device for loading the wafer onto the chuck is also constant. It is unusual to use different chucks to expose wafers of different sizes. In such a device, the chuck is, for example, secured on an XY table by fastening it with a bolt.

However, in the aforementioned prior art device, the chuck for mounting a member which is to be exposed, such as a wafer or the like, is secured on the movement table with the bolt. There is no problem when the lithography device is used as an exclusive device with a fixed wafer size for mass production. However, when the device is to be used as a multi-purpose device for trial manufacture and experiments, in order to expose members of various sizes, e.g., 2-6 inches, when an exposed member of a small size is placed on the chuck mounted on the movement table, a loading device matched to the wafer size is naturally used. Thus, if the chuck is not changed for one which matches the wafer size, loading of the wafer by the loading device will be impossible. In prior art lithography devices, since the chuck is secured on the movement table by fastening with a bolt, changing the chuck itself is troublesome. Further, wear powder is apt to be formed by the fixing and removing of the bolt. The fear arises that the parallelism of the exposed member mounting surface of the chuck has deviated.

SUMMARY OF THE INVENTION

The present invention was made in view of the problems of the aforementioned prior art. It is an object of the present invention to provide a composite movement table apparatus in which, when a rolling element with a retainer is interposed between an upper surface of a Z direction position adjustment mechanism and a Z table movable in the X and Y directions, deviation of the retainer is prevented and the accuracy of the parallelism and the positioning are maintained with high accuracy even when the table is moved at high speeds. The positioning can be achieved in a short time and accurately, while providing both smooth movement of the Z table in the X and Y directions and damping effect for vibrations.

Further, another object of the present invention is to provide a composite movement table apparatus in which a chuck can be changed depending on the size of the member to be mounted, without affecting the parallelism of the chuck.

In a composite movement table apparatus in accordance with the present invention, a Z direction position adjustment mechanism mounted on a base bed on a base is driven by a motor disposed on the base bed. A Z table mounted on a Z direction position adjustment mechanism and movable in the X and Y directions is moved vertically by the Z direction position adjustment mechanism. Vibrations caused during movement of the Z table in the X and Y directions are damped by vibration damping means. Hence, the vibrations of the Z direction position adjustment mechanism during rotation of the motor are not transmitted directly to the Z table, and deviation of the parallelism of the Z table is prevented, thereby providing high accuracy positioning.

Further, since a vibration damping means is provided between the Z table movable in the X and Y directions and the base bed, the vibrations caused in the Z table due to movement of a coarse adjustment table at high speeds can be damped quickly.

Further, a chuck holding member for receiving and holding a chuck which in turn receives and holds an exposed member, such as a wafer or the like, is provided on the Z table, and a recess is formed in the abutting surfaces of the chuck and the chuck holding member with gas suction means in communication with the recess. Thus, the chuck can be fixed in the holder with a uniform suction force, and since internal stress with respect to the chuck is uniform, deformation of the chuck due to external force is uniform and deformation such as warp, etc., is not caused by mounting the chuck. Accordingly, there is an advantage in that the chuck can be easily changed and, since no wear powders are caused at the time of changing the chuck, there is no problem with deviations of the parallelism of the mounting surface of the chuck.

DESCRIPTION OF THE PREFERRED EMBODIMENTS

Hereinafter, embodiments of the present invention will be described.

Figure 1:
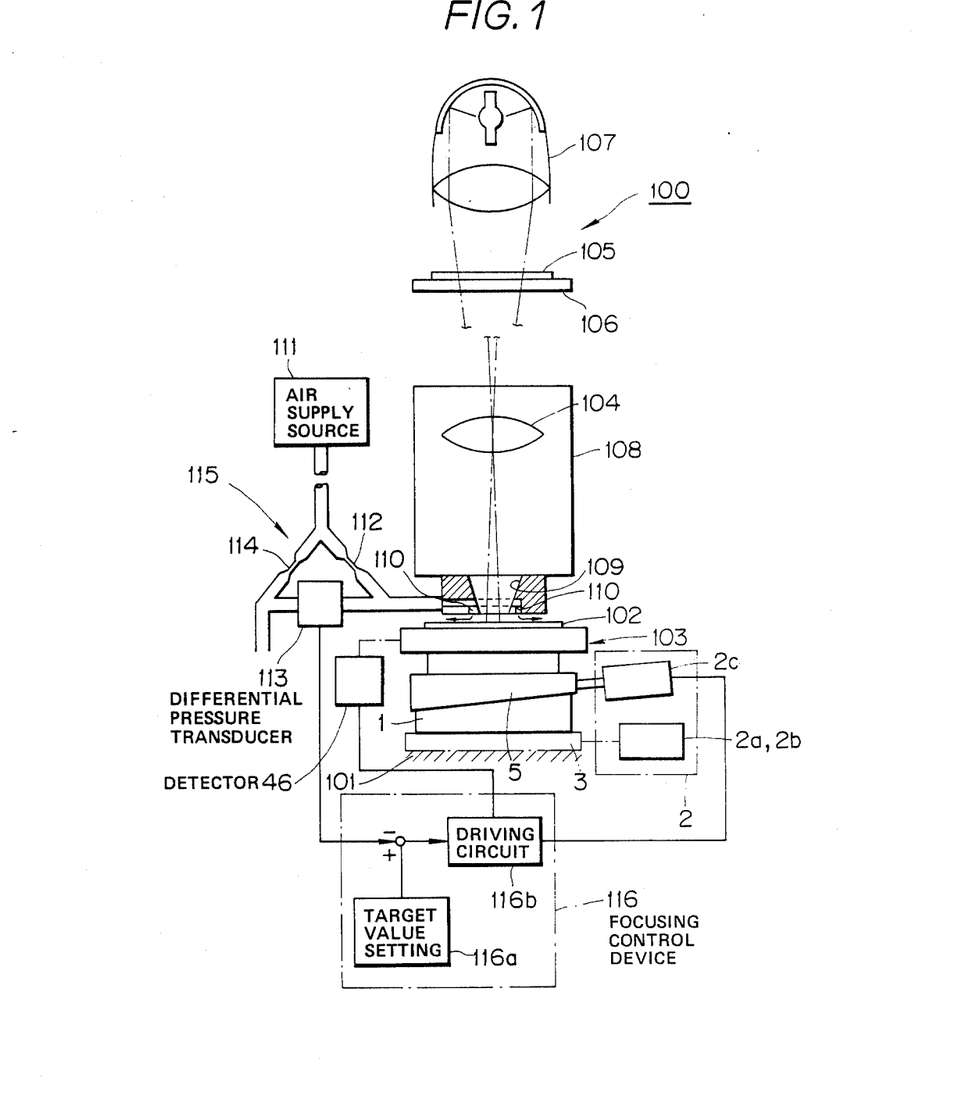
FIG. 1 is a schematic, partial block diagram illustrating an example of a projection photo lithography device to which the present invention is applicable.

Firstly, with reference to FIG. 1, a projection photo lithography device to which the present invention is applicable will be described. In FIG. 1, the reference numeral 100 designates a projection photo lithography device comprised of an XYZ stage 103 mounted on a base 101 with a wafer 102 mounted thereon, a reduction lens 104 fixedly disposed opposite the upper surface of the XYZ stage 103, a reticle mounting bench disposed above the reduction lens 104 and a reticle 105 mounted thereon, and a light source section 107 disposed at a position above the reticle mounting bench 106. An exposure light beam from the light source section 107 illuminates the wafer 102 on the XYZ stage 103, which serves as a composite movement table apparatus, through the reticle 105 and the reduction lens 104, and a circuit pattern formed on the reticle 105 is reduced and projected onto the wafer 102.

The XYZ stage 103 is made movable in three axes of direction, X, Y and Z, by a driving mechanism 2 having an XY axis driving mechanism 2a and a Z axis driving mechanism 2b. By moving in the Z axis direction, focusing is achieved.

At a lower end portion of a cylindrical body 108 holding the reduction lens 104 and opposed to the wafer 102, a through hole 109 for transmitting the exposure light beam is formed, and four air blowing nozzles 110 are formed at equal angular intervals on the periphery of the lower end portion. Each of the nozzles 110 is connected to a common air supply source 111 through a restrictor 112, and also to one input side of a differential pressure transducer 113. The other input side of the differential pressure transducer 113 is connected to a common air supply 111 through a restrictor 114 and also communicates with the atmosphere. Nozzles 110, air supply source 111, restrictors 112, 114 and differential pressure transducer 113 together constitute an air micrometer 115.

A detection signal of the differential pressure transducer 113 is supplied to a focusing control device 116, and the detection signal is compared with a predetermined target value set in a target value setting device 116a in the focusing control device 116. An error signal indicative of a difference in value is supplied to a driving circuit 116b which includes an amplifier, etc., and an exciting current for operating an actuator, such as a motor or the like, is produced. The exciting current is supplied to the Z axis driving mechanism 2c of the XYZ stage 103 to drive the same, and an interval between the nozzles 110 and the wafer 102 is adjusted to an appropriate value.

An example of the XYZ stage 103 is structured as shown in FIGS. 2-8.

Specifically, in FIG. 2, the reference numeral 1 designates a base bed which is mounted on a coarse adjustment table 3 which is moved in the plane of the X and Y axes, respectively, by the X axis driving mechanism 2a and the Y axis driving mechanism 2b mounted on the base 101.

Figure 3:
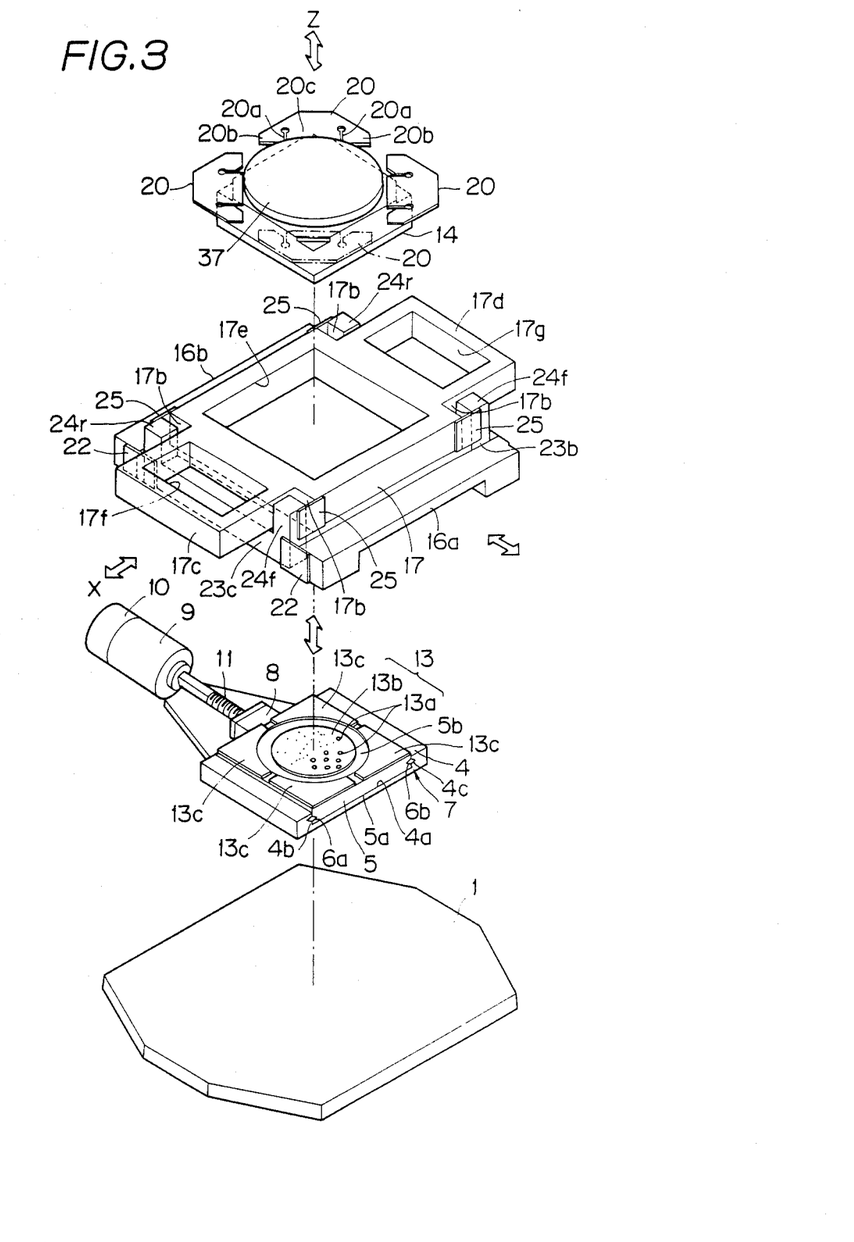
FIG. 3 is an exploded perspective view of the structure of FIG. 2.
Figure 4:
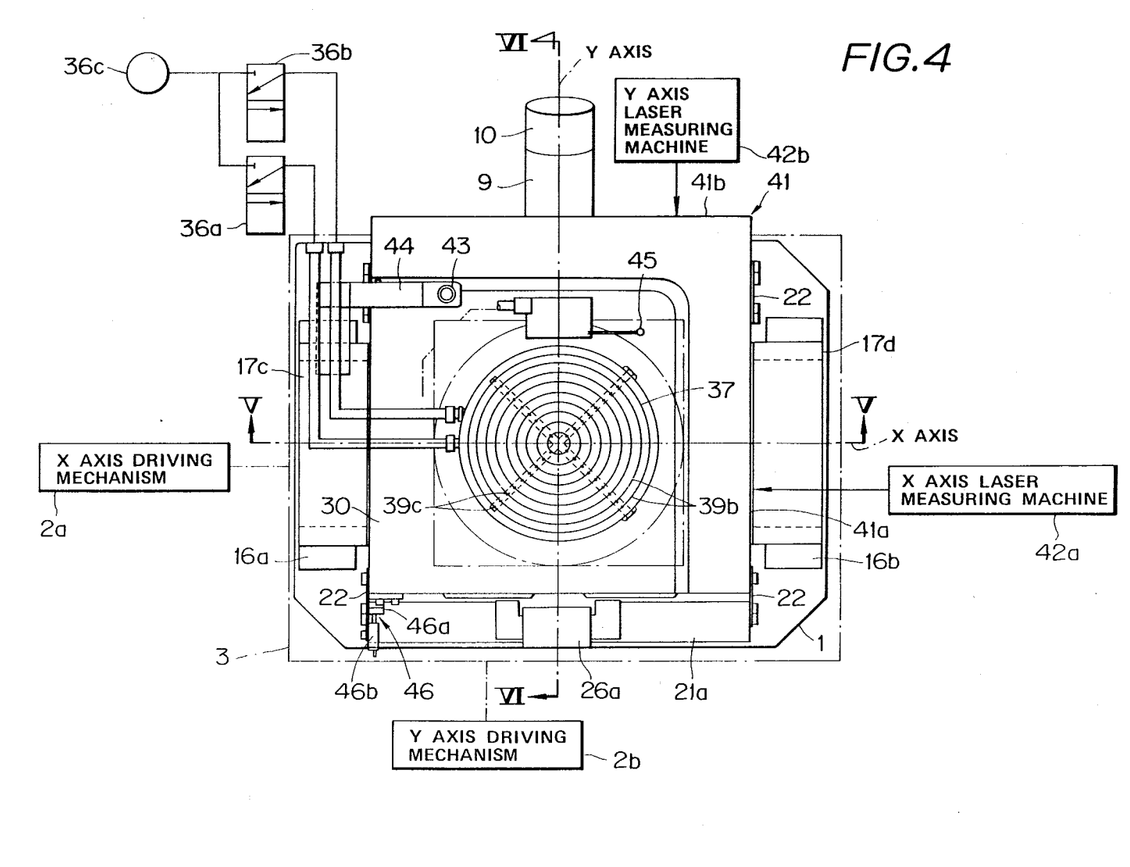
FIG. 4 is a plan view of a stage.
Figure 5:
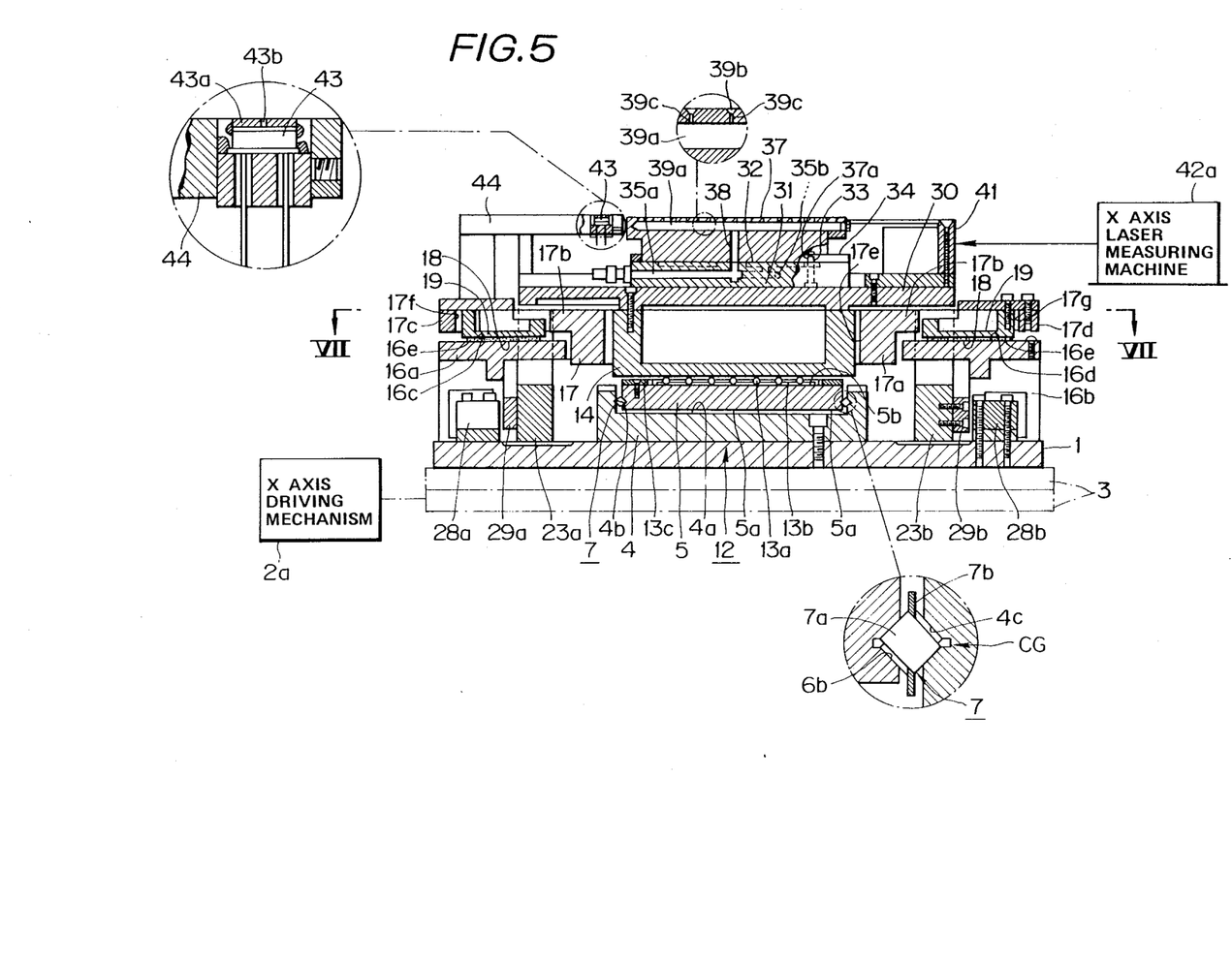
FIG. 5 is a sectional view taken along a line V—V in FIG. 4.

At the center portion of the base bed 1, there mounted a guide bench 4 as shown in FIGS. 3, 4 and 5. The guide bench 4 has a recess 4a of relatively wide width on the upper side and is slanted forwardly and downwardly. The guide bench 4 has a U-shaped section, and slant guide grooves 4b, 4c which are slanted forwardly and downwardly are formed in opposing inner wall surfaces of the guide bench 4 in the recess 4a.

An oblique surface slider 5 is provided in the recess 4a which is slidable along the slant guide grooves 4b, 4c. The lower surface 5a of the oblique surface slider 5 is an oblique surface which is in parallel relationship with the recess 4a, and the upper surface 5b of the oblique surface slider 5 is a horizontal plane, so that a longitudinal section has a trapezoid shape. Further, the oblique surface slider 5 has on its side surfaces slant guide grooves 6a, 6b formed therein, respectively, in opposing relationships with the slant guide grooves 4b, 4c. Cross roller assemblies 7 are interposed between the slant guide grooves 6a and 4b and between the slant guide grooves 6b and 4c. Each cross roller assembly 7 includes, as shown in an enlarged portion in FIG. 5, a number of cylindrical rollers 7a held by a holder 7b so that rolling axes of the rollers 7a are alternately shifted by 90° along a longitudinal direction of the holder 7b. Thus, in one cross roller assembly 7, the cylindrical rollers 7a are alternately in contact with different opposing surfaces of the slant guide grooves 6a and 4b, and similarly in the other cross roller assembly 7, the cylindrical rollers 7a are alternately in contact with different opposing surfaces of the slant guide grooves 6b and 4c. These cross roller assemblies 7, 7 are preloaded, and, hence, the holders 7b are seldom displaced. However, if it is necessary to minimize the displacement of the holders 7b, holder displacement preventing devices (not shown) utilizing a spring force or the like may be provided at both ends of each holder 7b. Even when such holder displacement preventing devices are provided, the sliding resistance between the guide bench 4 and the oblique surface slider 5 never affects the movement of the oblique surface slider 5. In other words, it is designed so that an essentially constant sliding resistance acts between the guide bench 4 and the oblique surface slider 5. The sliding resistance can be absorbed by adjusting the output of a DC motor 9 (which will be described later), depending on the magnitude of an absolute value of the sliding resistance. In this case, the slant guide grooves 4b, 4c and 6a, 6b and cross roller assemblies 7, 7 together constitute a cross roller guide CG.

Figure 6:
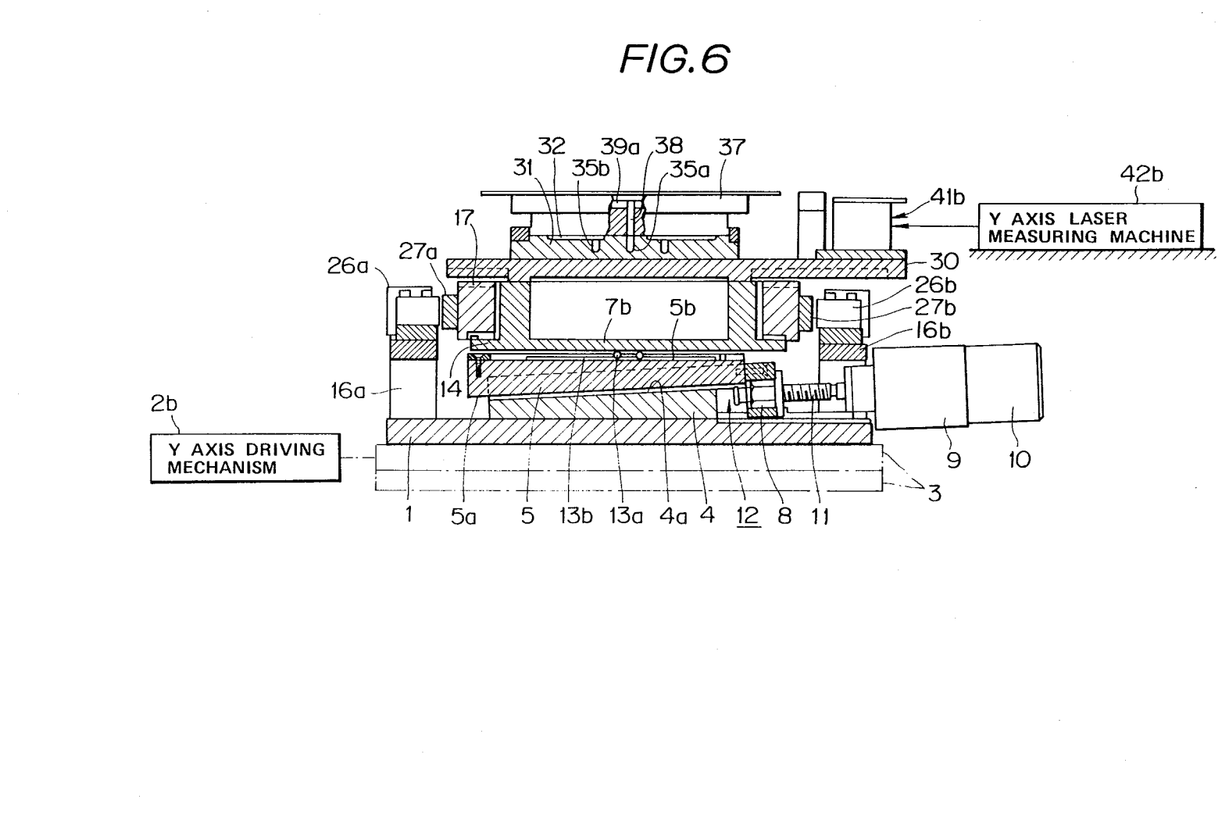
FIG. 6 is a sectional view taken along a line VI—VI in FIG. 4.

In the oblique surface slider 5, as shown in FIG. 6, a ball nut 8 is fixed to the rear end, and a feed screw shaft 11 is threaded in the ball nut 8. The feed screw shaft 11 is connected to a rotary shaft of the DC motor 9 constituting a driving mechanism, and an encoder 10 for detecting a rotational angle is attached to the motor 9. The motor 9 is servo controlled in accordance with the detection signal of the encoder 10. Thus, when the motor 9 is driven into rotation, the oblique surface slider 5 is moved along the bottom surface of the recess 4a of the guide bench 4. The guide bench 4, oblique surface slider 5, ball nut 8, and feed screw shaft 11 together constitute a Z direction position adjustment mechanism 12.

A Z table 14 is mounted on a horizontal upper surface 5b of the oblique surface slider 5 by means of steel balls 13a rollably held in a retainer 13b and spaced apart from each other. The Z table 14 is movable in the X and Y directions in a horizontal plane. The retainer 13b rotatably holds a number of steel balls 13a finished with high precision. Further, a stopper 13c is provided to prevent the retainer 13b from being drawn out of its position.

The base bed 1, as shown in FIG. 3, is provided with U-shaped support members 16a, 16b at both left and right sides thereof. A fine adjustment table 17 forming an XY movement table movable in the X and Y directions is supported on receiving surfaces 16c, 16d formed on the support members 16a, 16b through a layer of silicone oil 16e (viscosity of about $10^5$ centistokes), a viscous fluid of high viscosity.

Figure 7:
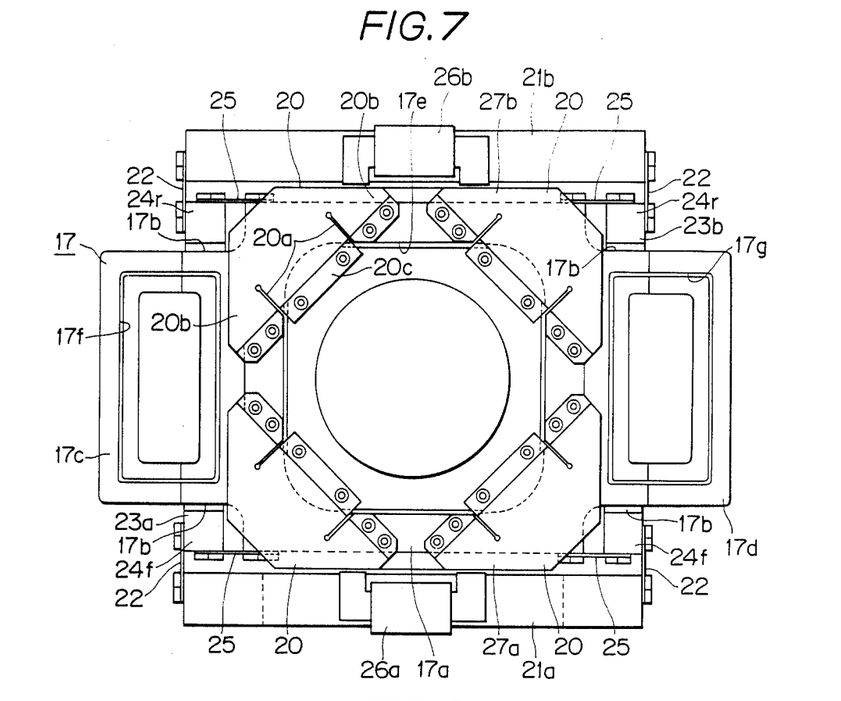
FIG. 7 is a sectional view taken along a line VII—VII in FIG. 5.

The fine adjustment table 17 has, as shown in FIGS. 5 and 7, a square portion 17a and support portions 17c, 17d which extend from both left and right sides of the square portion 17a outwardly to form step portions 17b of reduced width. The square portion 17a and the support portions 17c, 17d are formed integrally. An essentially square through hole 17e is bored at the central portion of the square portion 17a, and rectangular through holes 17f, 17g, are bored respectively in the support portions 17c, 17d. Vibration damping portions 19 having vibration damping surfaces 18 opposed to support members 16a, 16b are secured within the through holes 17f, 17g as shown in FIG. 5. The Z table 14 is inserted into the through hole 173. Leaf springs 20 are bridged between the upper surface of the fine adjustment table 17 and the upper surface of the Z table, as shown in FIG. 7. Each of the leaf springs 20 is formed in substantially a trapezoid shape, and parallel slits 20a are formed on both sides of a center line of the base portion of the trapezoid at symmetrical positions, so that the leaf spring 20 is divided into both side portions 20b and a central portion 20c. The central portion 20c is fixed to the Z table 14, and the both side portions 20b are fixed to the fine adjustment table 17 by means of screws, thereby urged the Z table 14 downwardly, that is, towards the Z direction position adjustment mechanism.

Further, on the base bed 1, there are mounted U-shaped support member 21a, 21b at the front and rear end portions (in the Y direction) of the base bed 1. Each of U-shaped blocks 23a, 23b is movable in the X direction and is connected to leg portions of the support member 21a, 21b through leaf springs 22. Strut portions 24f, 24r at both sides of each of the blocks 23a, 23b extend upwardly in the vicinity of the step portions 17b of the fine adjustment table 17, and a front side of the strut portion 24f and a rear side of the strut portion 24r are respectively connected to the square portion 17a of the fine adjustment table 17 by leaf springs 25 (FIG. 2).

As shown in FIG. 2, electromagnets 26a, 26b having U-shaped cores wound with exciting coils are mounted respectively on the support members 21a, 21b. Both ends of the electromagnet 26a are spaced by a predetermined space from a magnetic plate 27a secured to the front side edge of the fine adjustment table 17. Similarly, both ends of the electromagnet 26b are spaced by a predetermined space from a magnetic plate 27b secured to the rear side edge of the fine adjustment table 17. As shown in FIG. 5, under the support members 16a, 16b of the base bed 1 there are provided electromagnets 28a, 28b having U-shaped cores wound with exciting coils. Both ends of the electromagnets 28a, 28b are spaced by predetermined spaces from magnetic plates 29a, 29b, respectively, and secured at central portions of the blocks 23a, 23b. Accordingly, by adjusting the amount of exciting current supplied to the exciting coils of the electromagnets 28a, 28b to increase a magnetic force of one of the opposing electromagnets 28a, 28b more than a reference value and to decrease the other of the electromagnets 28a, 28b so that the magnetic force is balanced with a spring force due to a displacement of the leaf springs 22, the blocks 23a, 23b are displaced slightly in the X direction against the leaf spring 22. Thus, the fine adjustment table 17 is moved slightly in the X direction through the leaf springs 25. Further, by adjusting the amount of exciting current supplied to the exciting coils of the electromagnets 26a, 26b to increase a magnetic force of one of the electromagnets 26a, 26b more than a reference value and to decrease the other of the electromagnets 26a, 26b so that the magnetic force is balanced with a spring force due to a displacement of the leaf springs 25, the fine adjustments table 17 is moved slightly in the Y direction against the leaf springs 25.

Figure 8:
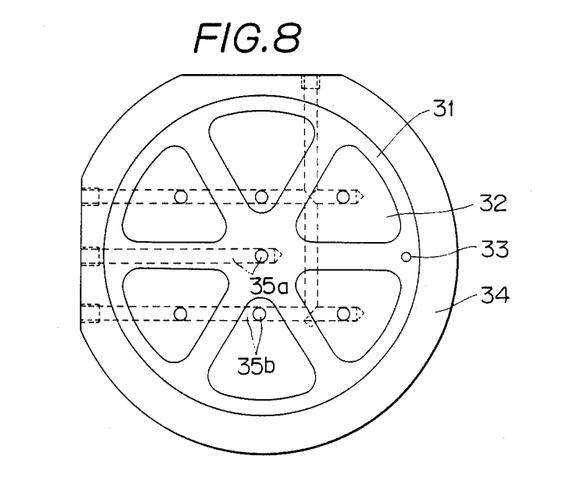
FIG. 8 is a plan view of a jig chuck to which the present invention is applicable.

Further, as shown in FIGS. 5 and 8, a chuck attaching plate 30 having a wide width is secured to the upper surface of the Z table 14, and a jig chuck 31 of a disk shape is fixed to the chuck attaching plate 30. In this jig chuck 31, six recesses 32, each having a sector shape, are formed in the upper surface of the jig chuck 31 at equal intervals around the circumference thereof, and a positioning pin 33 is studded into the jig chuck 31. Furthermore, a positioning ring frame 34 is fixed to the peripheral edge of the jig chuck 31. As shown in FIG. 8, a through hole 35a extending from the left end edge of the jig chuck 31 to the center and further extending from the center to the upper surface to form an opening at the upper surface is bored. A through hole 35b is bored in a U-shape to surround the through hole 35a, and the through hole 35b communicates with each of the recesses 32. The through holes 35a, 35b are connected to a gas suction device 36c, such as a compressor or the like, through, respectively, three way directional control valves 36a, 36b, as shown in FIG. 4.

On the jig chuck 31, there is mounted a wafer chuck 37 for mounting a wafer or a reticle. The lower surface of the wafer chuck 37 has a size and a degree of parallelism chosen so as to tightly close the recesses 32 of the jig chuck 31. Thus, the wafer chuck 37 is vacuum sucked by the jig chuck 31. A positioning hole 37a, in which the positioning pin 33 of the jig chuck 31 is inserted, is formed in the lower surface of the wafer chuck 37. As shown in FIGS. 4 and 5, a through hole 38 extending from the center of the lower surface of the wafer chuck 37 upwardly, and through holes 39a extending from the center radially are formed in the wafer chuck 37. Both ends of the through holes 39a are closed, and channels 39b of a narrow width are formed concentrically in the upper surface of the wafer chuck 37. The channels 29b and the through holes 39a communicate by small holes 39c. Hence, a plurality of types of chucks having mounting surfaces corresponding to the sizes of various mounted members to be used can be mounted.

Further, as shown in FIG. 4, a reflecting mirror 41 having a mirror portion 41a in a parallel relationship with the Y axis and a mirror portion 41b in parallel relationship with the X axis and formed in an L shape is fixed to the peripheral edge of the chuck attaching plate 30. An X axis laser measuring machine 42a which is opposed to the mirror portion 41a of the reflecting mirror 41, and a Y axis laser measuring machine 42b which is opposed to the mirror portion 41b are fixed, respectively, to the main body of the apparatus. These laser measuring machines 42a, 42b output position detection signals respectively indicating absolute positions of the fine adjustment table 17 in the X axis direction and in the Y axis direction. By these position detection signals, the position of the fine adjustment table 17 is detected accurately, and in accordance with this accurately detected position, the amount of current supplied to the electromagnets 26a, 26b, 28a, 28b are controlled, and the positioning in the X and Y directions of the wafer chuck 37 is carried out.

In FIGS. 4–6, the reference numeral 43 designates a photo detector for detecting nonuniformity in the amount of light from a light source attached to an L-shaped holding member 44 fixed to the support portion 17c of the fine adjustment table 17. By measuring the amount of light at a plurality of positions by sequentially moving the coarse adjustment table 3, pattern recognition is conducted on the basis of the measured position and the amount of light, thereby positioning the light source of exposure of the wafer 102. Further, in FIG. 4, the reference numeral 45 designates a temperature detector for measuring the temperature at the position of the wafer chuck 37, and based on the measured value, an air conditioning device is controlled to maintain the temperature at a predetermined value. Further, in FIG. 4, the reference numeral 46 designates a detector which utilizes magnetism for detecting three points, including a control origin (neutral position), an upper limit position, and a lower limit position in the Z axis direction. Its magnetic body 46a is fixed to the chuck attaching plate 30, and a detecting section 46b is fixed to the support member 21a. By supplying a detection signal outputted from the detecting section 46b to a driving circuit 116b of the aforementioned focusing control device 116, the origin is set.

Next, the operation of the above embodiment will be described. First, as shown in FIG. 4, the through holes 35a, 35b of the jig chuck 31 are open to the atmosphere by the three way directional control valves 36a, 36b. The wafer chuck 37 shown in FIG. 5 is selected depending on the size of the wafer 102 to be exposed. The positioning pin 33 of the jig chuck 31 is inserted into the positioning hole 37a of the wafer chuck 37. The wafer chuck 37 is mounted by engaging the peripheral surface of the wafer chuck 37 within the guide frame 34.

From this condition, the three way directional control valve 36b is changed, and the through hole 35b of the jig chuck 31 is made to communicate with the gas suction device 36c. As a result, since the recesses 32 are under vacuum, the wafer chuck 37 is attracted and fixed. Since the through hole 35a of the jig chuck 31 and the through hole 38 formed in the chuck 37 are in communication, when the wafer 102 is placed on the mounting surface of the chuck 37 by a loading device (not shown), by changing over the three way directional control valve 36a to make the through hole 35a of the jig chuck 31 communicate with the gas suction device 36c, the wafer 102 can be held by vacuum suction.

When an adjustment of the position of the wafer 102 is required and if the distance is great, the coarse adjustment table 3 is moved at a high speed to a position near the target position by the X and Y dirving mechanisms 2a, 2b. Since the fine adjustment table 17 to which the Z table 14 is connected by the leaf springs 20 is supported by the leaf springs 22, 25, due to the inertia of the fine adjustment table 17, vibrations are caused at the time when the movement of the coarse adjustment table 3, which has been moving at high speeds, is stopped. However, since the high viscosity silicone oil 16e is interposed between the receiving surfaces 16c, 16d of the base bed 1 and the vibrations damping surface 18 of the fine adjustment table 7, the vibrations caused by any two dimensional movements of the fine adjustment table 17 are uniformly damped by a damping resistance due to the viscosity of the silicone oil 16e. Thus, the vibrations of the fine adjustment table 17 are stopped quickly. Moreover, since the vibration damping sections 19 are formed at both end portions of the fine adjustment table 17, even when vibrations due to turning movement around the center axis of the fine adjustment table 17 are caused by the movement of the coarse adjustment table 3, the vibrations can be effectively damped.

For fine adjustment of the position of the wafer 102 based on measured values of the laser measuring machines 42a, 42b, by controlling the amount of currents supplied to the exciting coils of the electromagnets 26a, 26b and/or electromagnets 28a, 28b, the fine adjustment table 17 is moved minutely in the X and Y directions. It is possible to achieve accuracy of positioning on the order of a sub-micron. During movement of the fine adjustment table 17, since the side walls of the vibration damping sections 19 are never in contact with the silicone oil 16e, the resistance is not increased due to the compression of the silicone oil 16e. Thus a smooth movement of the fine adjustment table 17 can be insured.

Next, the focusing of the lithography device 100 is carried out. During focusing, pressurized air is supplied through the restrictor 112 to the nozzles 110 from the air supply source 111 to bring the air micrometer 115 into operating condition. In this condition, the focusing control device 116 is operated.

When the focusing control device 116 is in the operating condition, an error signal representative of the difference in value between a focusing target value preset by the target value setting 116a and a differential pressure detection signal outputted from the differential pressure transducer 113 is supplied to the driving circuit 116b. The exciting current outputted from the driving circuit 116b is supplied to the DC motor 9 which constitutes the Z axis driving mechanism 2c. Accordingly, when the differential pressure detection signal is smaller than the target value and the interval between the nozzles 110 and the wafer 102 is accordingly larger than a reference value, for example, the rotation of the DC motor 9 is reversed. When the DC motor 9 rotates in the reverse direction, the rotational force is transmitted through the ball screw 11 to the oblique surface slider 5. The oblique surface slider 5 is retracted, guided by the cross guide CG, and moves upwardly due to the retraction. Since the oblique surface slider 5 moves with its upper surface 5b maintained horizontally, the position of the rolling element with retainer 13 mounted on the upper surface 5b does not deviate, and a smooth retraction of the oblique surface slider 5 can be insured. Moreover, by insuring the linear movement of the oblique surface slider 5 with the aid of the cross roller guide CG, the parallelism of the upper surface of the oblique surface slider 5 does not deviate. In addition, since it is possible to manufacture the steel balls 13a with high accuracy, and the parallelism of the upper and lower surfaces of the jig chuck 31 and chuck 37 can be maintained precisely, irrespective of the movement of the oblique surface slider 5, it is possible to prevent deviations in the parallelism of the upper surface of the chuck 37 on which the wafer 102 is mounted.

Due to the upward movement of the upper surface 5b of the oblique surface slider 5, the Z table 14 mounted on the oblique surface slider 5 through the rolling element with retainer 13 is moved upwardly. As a result, since the chuck attaching plate 30, jig chuck 31, and chuck 37 mounted on the Z table 14 are also raised, the interval between the wafer 102 and the nozzles 110 becomes narrow. When the interval coincides with the reference value, the upward movement is stopped to complete the focusing. Conversely, when the value of the differential pressure detection signal is larger than the target value, the control device 116 supplies an exciting current to drive the DC motor 9 forwardly. When the DC motor 9 is rotated forwardly, the oblique surface slider 5 is advanced, and the Z table, chuck attaching plate 30, jig chuck 31, and chuck 37 are lowered, thereby enlarging the interval between the wafer 102 and the nozzles 110. When the reference position is reached, the downward movement is stopped and the focusing is completed.

When the focusing is completed, in order to achieve position adjustment of the wafer 102, when the distance of movement of the wafer 102 is large, the coarse adjustment table 3 is moved to a position near the target position at a high speed by the X axis driving mechanism 2a and/or Y axis driving mechanism 2b. Then the fine adjustment table 17 is moved minutely in the X and/or Y directions by energizing the exciting coils of the electromagnets 26a, 26b and/or electromagnets 28a, 28b of the fine adjustment table 17. By detecting the absolute value of this minute movement by the laser measuring machines 42a and/or 42b, and by controlling the amount of currents supplied to the exciting coils of the electromagnets 26a, 26b and/or electromagnets 28a, 28b on the basis of the detected value, it is possible to achieve accuracy of positioning on the order of a submicron. As described above, owing to the employment of the electromagnets as the driving mechanism for effecting the fine adjustment in the X and Y directions, vibrations are not caused, and it is possible to prevent the deviation of position in the Z axis direction when the Z table 14 and the fine adjustment table 17 move in the X and Y directions.

When a wafer 102 of a different size is to be mounted, the three way directional control valves 36a, 36b are returned to the condition of FIG. 4, the connection between the through holes 35a, 35b or the jig chuck 31 and the gas suction device 36c is interrupted, and the through holes 35a, 35b are open to the atmosphere. Then, the wafer chuck 37 is removed, and in a similar manner as described above, another chosen wafer chuck 37 is vacuum mounted on the jig chuck 31.

When the position of the light source section 107, such as a mercury lamp or the like is to be adjusted, the mercury lamp is first put at a predetermined position and lit, making the exposure light beam illuminate the upper surface of the XYZ stage 103. Under illumination by the exposure light beam, the coarse adjustment table 3 is moved by the X axis driving mechanism 2a and/or the Y axis driving mechanism 2b. The light amount detector 43 is moved to a plurality of positions for the illumination range of the exposure light beam. The light amount detection output of the light amount detector 43 at each position is supplied to a processing device (not shown) to detect the distribution of the amount of light of the exposure light beam. This distribution is displayed, for example, on a display unit with different colors for different amounts of light. By adjusting the position of the mercury lamp in accordance with this display, the precision of the position can be improved.

In the embodiments described in the foregoing, although the oblique surface slider 5 is supported through the cross roller guide CG on the guide bench 4 of the base bed 1 mounted on the coarse adjustment table 3, the present invention is not limited to this structure. The surface of the slant recess 4a of the guide bench 4 may be in surface contact with the lower surface 5a of the oblique surface slider 5.

Further, the driving mechanism for the oblique surface slider 5 is not limited to the embodiment described above. A pulse motor may be used in place of the DC motor, and if necessary, a reduction gear may be incorporated. Further, various driving mechanism, including a feed screw type, cam driving type, etc., may be used.

Further, in the embodiments described above, the Z table 14 mounted on the oblique surface slider 5 is moved in the X and Y directions. However, the present invention is also applicable to a case wherein the Z table 14 is moved only in the X direction or only in the Y direction. In such a case, for the rolling element 13, not only steel balls but also rollers are also applicable.

Also in the embodiments described above, although the vibration damping sections 19 are provided at two portions of the fine adjustment table 17, the present invention is not limited to this. The number and the area of the vibration damping sections 19 may be selected arbitrarily.

Further, in the embodiments described above, the silicone oil 16e is injected between the receiving surfaces 16c, 16d and the vibration damping surfaces 18 so that the silicone oil 16e is present at a position spaced inwardly from the side edge of the vibration damping surface 18 by the range of movement of the fine adjustment table 17. However, the present invention is not so limited, and the silicone oil 16e may cover the whole surface of the vibration damping surface 18. What is essential is to interpose the silicone oil such that no unnecessary resistance is caused between the side wall and the silicone oil when the side wall is in contact with the silicone oil 16e during movement of the fine adjustment table 17.

Further, in the embodiments described above, silicone oil 16e is used as the viscous fluid. The present invention is not so limited and any fluid having a high viscosity is, accordingly, applicable.

Further, in the above embodiments, although the guide frame 34 is provided at the peripheral portion of the upper surface of the jig chuck 31, the present invention is not so limited. The guide frame 34 may be omitted by providing a plurality of positioning pins 33 and positioning holes 37a.

Further, in the above embodiments, although the jig chuck 31 and the X table 14 constituting the chuck holding body are separate members, the present invention is not limited to this, and the jig chuck 31 may be formed on the Z table 14 integrally therewith. Moreover, the present invention is not limited to the case wherein the recesses are formed only in the upper surface of the jig chuck 31. The recesses 32 of the jig chuck 31 may be omitted and instead, recesses may be formed in the lower surface of the wafer chuck 37 and the through hole 35b may be opened at the upper surface of the jig chuck 31. Alternatively, recesses may be formed in both the jig chuck 31 and the wafer chuck 37. Recesses tightly enclosed by abutting surfaces of the jig chuck 31 and the wafer chuck 37 are formed, and these recesses communicate with the gas suction device 36c so that the jig chuck 31 is capable of holding by vacuum the wafer chuck 37.

Further, in the embodiments described in the foregoing, the present invention is applied to a reduction projection type exposure device. However, the present invention is not so limited, and may be applied to an arbitrary XYZ table, such as an XYZ table for other machine tools, etc.

I claim:

1. A composite movement table apparatus capable of moving at least in a Z axis direction, comprising:
    a coarse adjustment table mounted on a base and driven in an X axis and a Y axis direction;
    a base bed mounted on said coarse adjustment table;
    a Z table movable in the X axis and Y axis directions as well as in the Z axis direction;
    a Z direction position adjusting mechanism fixed to said base bed for adjusting the position of said Z table in the Z axis direction relative to said base bed, said Z direction position adjusting mechanism supporting said Z table;
    vibration damping means provided between said Z table and said base bed for damping vibrations caused in said Z table during movement thereof in the X axis and Y axis directions; and
    a driving mechanism for actuating the Z direction position adjusting mechanism in the Z axis direction including a driving motor fixed to said base bed.

2. The apparatus of claim 1 wherein said Z direction position adjusting mechanism includes a slant guide section formed on said base bed, an oblique slider movable by being guided by said slant guide section and having a horizontal upper surface, and a driving mechanism for driving said oblique slider to advance and to retract along said slant guide section.

3. The apparatus of claim 2 wherein said slant guide section includes a cross roller guide, and said driving mechanism is provided with a screw type feeding device including a screw shaft having an axis parallel to said slant guide section and being driven into rotation by the driving motor.

4. An apparatus according to claim 1 wherein said Z table is mounted on said Z direction position adjusting mechanism by means of a rolling element with retainer so that said Z table is movable horizontally with respect to said Z direction position adjusting mechanism.

5. The apparatus of claim 1 wherein said Z table is resiliently coupled with a fine adjustment XY movement table supported by the base bed, and
    said vibration damping means includes a vibration damping section having a vibration damping surface parallel to a movement surface formed on said XY movement table, a receiving surface formed on said base bed and opposed to and in close proximity to said vibration damping section, and a viscous fluid interposed between said receiving surface and said opposed vibration damping surface, said viscous fluid filling a space between said receiving surface and said vibration damping surface with a depth of said viscous fluid equal to or less than the space therebetween, thereby providing a damping effect to said vibration damping surface.

6. The apparatus of claim 5 wherein said vibration damping surface and said receiving surface are formed at each of both side portions of said XY movement table.

7. The apparatus of claim 5 wherein said viscous fluid is a silicone oil having a high viscosity.

8. The apparatus of claim 5 wherein a leaf spring is provided between said Z table and said XY movement table to urge said Z table in the X axis direction towards said oblique surface slider.

9. The apparatus of claim 1 wherein a chuck holding member is disposed on said Z table, a suction chuck for holding an exposed member of an exposure device is removably held on said chuck holding member, a recess forming a tightly enclosed space is formed at an abutting portion between said chuck and said chuck holding member, and said recess communicates with gas suction means.

10. The apparatus of claim 6 wherein said viscous fluid is a silicone oil having a high viscosity.

* * * * *

UNITED STATES PATENT OFFICE
CERTIFICATE OF CORRECTION

Patent No. 4,739,545　　　　　　　　Dated April 26, 1988

Inventor(s)　Hideaki Oyanagi

It is certified that error appears in the above-identified patent and that said Letters Patent are hereby corrected as shown below:

On the title page, under the heading "Foreign Application Priority Data", please insert the following:

Mar. 19, 1986 [JP] Japan . . . . . 61-040186[U]

Mar. 28, 1986 [JP] Japan . . . . . 61-045917[U]

In the Specification:

Column 5, line 43

Change [XY] to -- X --

Change [Z] to -- Y --

Column 5, line 44

After "mechanism 2b." insert

-- A Z axis driving mechanism 2c is also provided. --

Column 6, line 14

After the word "there," insert -- is --

Column 7, line 39

Change [173] to -- 17e --

UNITED STATES PATENT OFFICE
CERTIFICATE OF CORRECTION

Patent No. 4,739,545　　　　　　　　　Dated　April 26, 1988

Inventor(s)　Hideaki Oyanagi

It is certified that error appears in the above-identified patent and that said Letters Patent are hereby corrected as shown below:

Column 7, line 50

Change [urged] to -- urging --

Column 8, line 67

Change [29b] to -- 39b --

Signed and Sealed this

Eleventh Day of October, 1988

*Attest:*

DONALD J. QUIGG

*Attesting Officer*　　　*Commissioner of Patents and Trademarks*